United States Patent
Herrmann et al.

(10) Patent No.: US 11,441,823 B2
(45) Date of Patent: Sep. 13, 2022

(54) ADSORPTION HEAT PUMP AND METHOD FOR OPERATING AN ADSORPTION HEAT PUMP

(71) Applicant: FAHRENHEIT GMBH, Munich (DE)

(72) Inventors: Ralph Herrmann, Halle/Saale (DE); Walter Mittelbach, Freiburg i. Br. (DE)

(73) Assignee: FAHRENHEIT GMBH, Munich (DE)

(*) Notice: Subject to any disclaimer, the term of this patent is extended or adjusted under 35 U.S.C. 154(b) by 202 days.

(21) Appl. No.: 16/089,785

(22) PCT Filed: Feb. 13, 2017

(86) PCT No.: PCT/EP2017/053091
§ 371 (c)(1),
(2) Date: Sep. 28, 2018

(87) PCT Pub. No.: WO2017/174235
PCT Pub. Date: Oct. 12, 2017

(65) Prior Publication Data
US 2019/0113258 A1   Apr. 18, 2019

(30) Foreign Application Priority Data
Apr. 6, 2016  (DE) .......................... 102016106234.0

(51) Int. Cl.
*F25B 17/08*  (2006.01)
*C09K 5/04*   (2006.01)

(52) U.S. Cl.
CPC ............ *F25B 17/083* (2013.01); *C09K 5/047* (2013.01); *F25B 17/08* (2013.01); *Y02A 30/27* (2018.01); *Y02B 30/00* (2013.01); *Y02B 30/62* (2013.01)

(58) Field of Classification Search
CPC ........ F25B 17/083; F25B 17/08; C09K 5/047; Y02B 30/62; Y02B 30/64; Y02B 30/00; Y02A 30/277; Y02A 30/27
(Continued)

(56) References Cited

U.S. PATENT DOCUMENTS 2,967,148 A * 1/1961 Karnofsky ............. C10G 25/06
                                                 210/672
4,183,227 A * 1/1980 Bouvin ................. F25B 17/083
                                                  62/480
(Continued)

FOREIGN PATENT DOCUMENTS

DE   102011077079 A1   12/2012   .............. F25B 19/02
DE   102011083974 A1   4/2013    ............... C09K 5/04
(Continued)

OTHER PUBLICATIONS

The Notification Concerning Transmittal of International Preliminary Report on Patentability (Chapter I of the Patent Cooperation Treaty), in English, dated Oct. 18, 2018, which was issued by the International Bureau of WIPO in Applicant's corresponding international PCT application having Serial No. PCT/EP2017/053091, filed on Feb. 13, 2017.
(Continued)

*Primary Examiner* — Eric S Ruppert
*Assistant Examiner* — Kirstin U Oswald
(74) *Attorney, Agent, or Firm* — Bodner & O'Rourke, LLP; Gerald T. Bodner; Christian P. Bodner

(57) ABSTRACT

The invention relates to an adsorption heat pump, having an adsorber device, comprising a solid adsorbent, an evaporator, a condenser or an evaporator/condenser and an operating medium in an operating circuit, wherein the operating circuit has a gaseous half-circuit between the evaporator, the adsorber device and the condenser or the evaporator/con-
(Continued)

Figure 1:
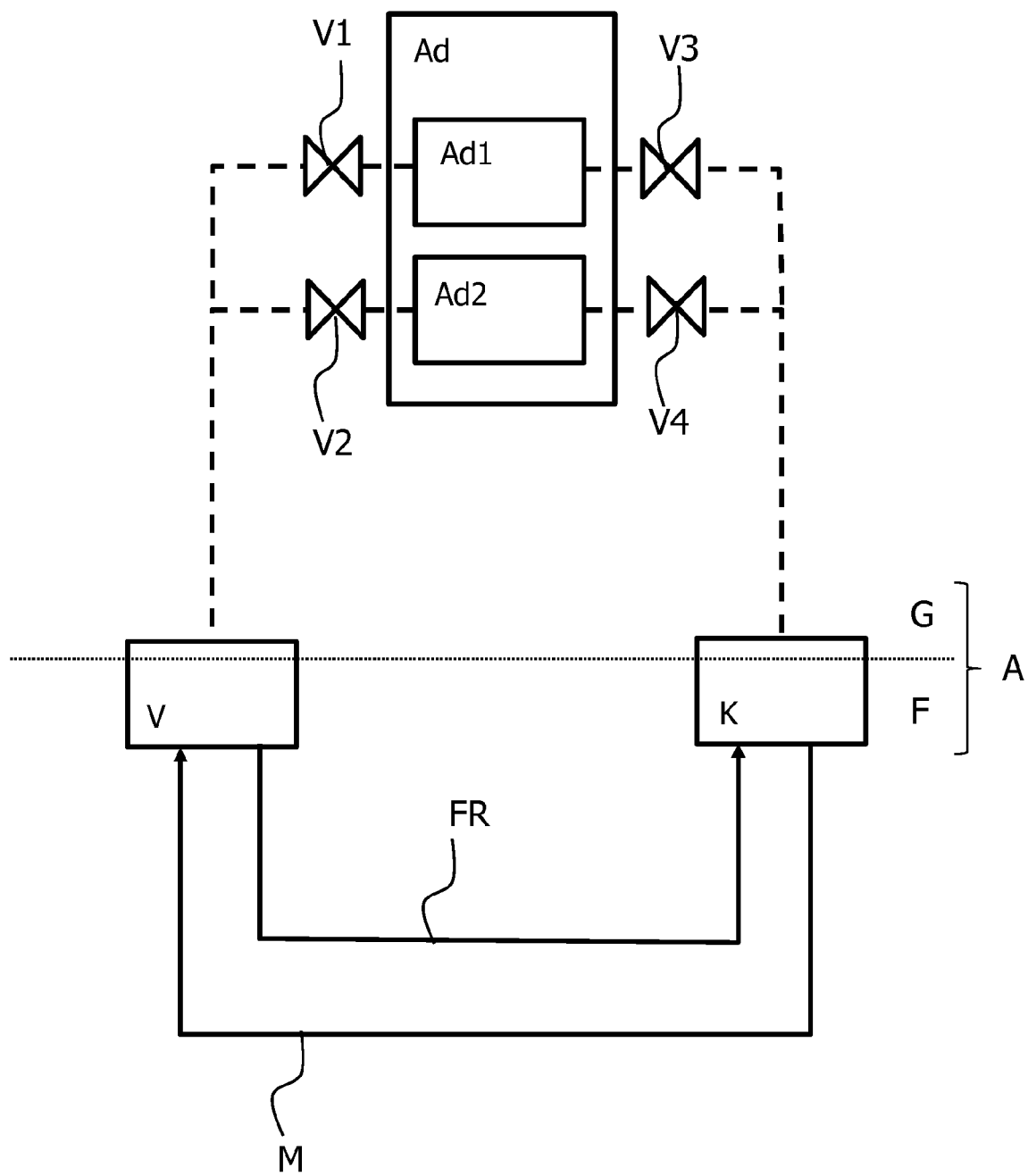

denser and the adsorber device, in which gaseous half-circuit the operating medium is gaseous, and a liquid half-circuit which is configured between the evaporator and the condenser and in which the operating medium is liquid, wherein the liquid half-circuit contains a liquid functional medium which can be mixed with the operating medium and lowers the vapor pressure of the operating medium, with a vapor pressure at 25° C. of below 0.2 mbar. In a method for operating an absorption heat pump with an operating circuit comprising an adsorber, an evaporator and a condenser or an evaporator/condenser and an operating medium which is circulated between the adsorber, the evaporator and the condenser, the operating medium is mixed, when running through the operating circuit, within the liquid half-circuit with a liquid functional medium which lowers the vapor pressure, and the operating medium is separated from the functional medium before the transfer into the gaseous half-circuit of the operating circuit.

21 Claims, 8 Drawing Sheets

(58) Field of Classification Search
USPC .......................................................... 62/480
See application file for complete search history.

(56) References Cited

U.S. PATENT DOCUMENTS

| | | | | |
|---|---|---|---|---|
| 4,479,364 A | * | 10/1984 | Maier-Laxhuber ... | F25B 29/006 62/238.3 |
| 4,594,856 A | * | 6/1986 | Rothmeyer ........... | F25B 17/083 62/480 |
| 4,742,868 A | * | 5/1988 | Mitani ................... | F25B 17/08 62/480 |
| 4,924,676 A | * | 5/1990 | Maier-Laxhuber ........................ | B60H 1/3201 62/480 |
| 8,932,478 B2 | * | 1/2015 | Seiler .................... | B01D 3/343 95/143 |
| 9,062,899 B2 | | 6/2015 | Boesmann et al. | |
| 9,797,629 B2 | | 10/2017 | Mittelbach | |
| 2011/0088418 A1 | * | 4/2011 | Kontomaris .......... | C09K 5/047 62/476 |
| 2011/0132550 A1 | * | 6/2011 | Avery .................... | B01D 1/16 159/22 |
| 2013/0213062 A1 | | 8/2013 | Braunschweig et al. ....... | 62/101 |
| 2013/0219949 A1 | | 8/2013 | Seiler et al. .................... | 62/476 |
| 2014/0250927 A1 | * | 9/2014 | Yoshida ................. | F25B 15/00 62/190 |
| 2014/0260359 A1 | * | 9/2014 | Aso .................... | H05K 7/20827 62/238.3 |
| 2016/0033176 A1 | * | 2/2016 | Zhou ...................... | F25B 15/02 62/109 |

FOREIGN PATENT DOCUMENTS

| | | | | |
|---|---|---|---|---|
| WO | WO2005113702 A1 | 12/2005 | ............... | C09K 5/04 |
| WO | WO2009153245 A2 | 12/2009 | ............... | F25B 17/08 |
| WO | WO2012052011 A2 | 4/2012 | ............... | F25B 17/00 |
| WO | WO2012062656 A1 | 5/2012 | ............... | C09K 5/04 |

OTHER PUBLICATIONS

The English translation of the International Preliminary Report on Patentability (Chapter I of the Patent Cooperation Treaty), dated Oct. 9, 2018, which was issued by the International Bureau of WIPO in Applicant's corresponding international PCT application having Serial No. PCT/EP2017/053091, filed on Feb. 13, 2017.

The Written Opinion of the International Searching Authority, in English, dated Apr. 19, 2017, which was issued by the International Bureau of WIPO in Applicant's corresponding international PCT application having Serial No. PCT/EP2017/053091, filed on Feb. 13, 2017.

The International Search Report, in English, dated Apr. 19, 2017, which was issued by the International Bureau of WIPO in Applicant's corresponding international PCT application having Serial No. PCT/EP2017/053091, filed on Feb. 13, 2017.

\* cited by examiner

ADSORPTION HEAT PUMP AND METHOD FOR OPERATING AN ADSORPTION HEAT PUMP

The invention relates to an adsorption heat pump and to a method for operating an adsorption heat pump.

In their basic structure, adsorption heat pumps consist of an evaporator and a condenser as well as an adsorber. In the operation of such installations, an operating medium is circulated between these components. The operating medium is adsorbed in the adsorber in a first step. Thereby, it passes over into the gaseous phase within the evaporator, whereby heat from the environment is taken up at the evaporator. In a second step, the operating medium is expelled at the adsorber. The external energy supply necessary to this effect is performed, for example, by utilizing waste heat. The expelled operating medium is liquefied again in the condenser and thereby releases heat. This process causes heat from the evaporator to be pumped to the side of the condenser. Such a heat pump may be realized without any moved parts.

Often, the evaporator and the condenser can be combined in one component part. This component part then forms a so-called evaporator/condenser. Here, both the condensation and the evaporation of the operating medium take place in the same place. Double-acting adsorption heat pumps are also possible in which the condenser and the evaporator alternate in their functions and thus may act both as a condenser and an evaporator depending on the work cycle. Water is, for example, used as the operating medium. But other substances may be used as well.

In such installations, the evaporators often turn out to be the components of the operating circuit the structure of which has a performance-limiting effect, since only limited amounts of the operating medium can be evaporated with a given component size and surface. Changing the operating medium, e.g. using methanol or ammonia, may in this case provide only very limited performance increases which moreover must be bought at the expense of additional disadvantageous. Mostly, the alternative operating media, as compared to water, have the disadvantage of being inflammable and/or toxic. In an overall view, the possible increase of the evaporation performance is in this respect only in an unfavorable relationship.

It is known that the vapor pressure of a liquid with substances dissolved therein, as a rule, is lower than that of the pure liquid. The energy expenditure in evaporating the operating medium is thus increased by the addition of dissolved substances. Accordingly, the evaporator performance is enhanced per unit of quantity. If water is used, for example, as the operating medium, salts may be added, for instance. The use of soluble solids, however, entails undesired accumulations and crystal formation in the evaporator and may promote its corrosion.

If organic liquids are dissolved in the operating medium for lowering the vapor pressure, as a rule, not only the operating medium will be evaporated but the organic component and possible decomposition products as well will pass over into the gaseous phase. These additional components in the gaseous phase thus raise the pressure in the vacuum system whereby the performance of the adsorber is considerably reduced. The disadvantageous effect also occurs with inorganic liquid additives, e.g. acids. These additives as well outgas extremely. Moreover, acids are extraordinarily unsuitable due to their strong aggressivity.

The task is therefore to overcome the mentioned disadvantages. A possibility should in particular be proposed to lower the vapor pressure of the operating medium without the mentioned disadvantageous side effects occurring. Furthermore, there is also the task of designing the operating circuit components of the adsorption heat pump to be more resistant against corrosion or frost, and moreover of improving the wetting behavior and the heat contact between the operating medium and the heat transfer surface in the evaporator and in the condenser. On the one hand, a correspondingly improved adsorption heat pump and a method, on the other, for operating an adsorption heat pump are wanted in which the mentioned disadvantages may be avoided.

The task is solved by an adsorption heat pump having the features set forth herein and a method for operating an adsorption heat pump having the features set forth herein. Various embodiments of the present invention disclosed herein include appropriate and/or advantageous configurations of the device and the method, respectively.

The adsorption heat pump comprises an adsorber device, comprising a solid absorbant, an evaporator, a condenser or an evaporator/condenser and an operating medium in an operating circuit. In this case, the operating circuit has a gaseous half-circuit between the evaporator, the adsorber device and the condenser or the evaporator/condenser, in which gaseous half-circuit the operating medium is gaseous, and a liquid half-circuit which is configured between the evaporator and the condenser and in which the operating medium is liquid. The liquid half-circuit contains a liquid functional medium which can be mixed with the operating medium and lowers the vapor pressure of the operating medium.

The inventive adsorption heat pump is based on the idea of admixing to the functional medium in the sections where the operating medium is present in the operating circuit in a liquid form, a functional medium at least in sections which has a positive effect on the characteristics of the operating medium. Thereby, the operating medium virtually does not transfer into the gaseous phase, it is in particular neither significantly adsorbed nor desorbed in the adsorber device.

This behavior is guaranteed by a low vapor pressure of the functional medium, which is e.g. at 25° C. lower than 1% of the vapor pressure of the operating medium. Accordingly, a functional medium having a vapor pressure at 25° C. of 0.2 mbar is suitable for the operating medium water.

In one embodiment, a mixing branch is provided in the liquid half-circuit leading from the condenser to the evaporator, in which mixing branch a depleted mixture of the functional medium and the operating medium is situated, whereas a returning branch (RF) is present leading from the evaporator to the condenser, in which returning path an enriched mixture of the functional medium with water or pure functional medium is situated. The terms "enriched" and "depleted" mean that the quantitative proportion of the functional medium in the operating medium has a high value in the enriched state and, as compared thereto, assumes a lower value in the depleted state.

In this embodiment, a circuit for the functional medium is provided, in which the functional medium enters into a mixture with the operating medium, is carried along and finally at least in part segregated and returned as an enriched mixture so as to be mixed again with the operating medium into a depleted mixture.

In a further embodiment, the liquid half-circuit has at least one reservoir containing the functional medium or a mixture of functional medium and operating medium, with supply lines and discharge lines being provided between the reservoir and the evaporator and/or the condenser and/or in the path of the operating medium between the condenser and the evaporator. In this variant, the functional medium may be temporarily stored and distributed from there. The substance flow between the reservoir and the other components may be mutually separated by suitable valves.

In a further embodiment, the functional medium remains permanently in the evaporator and is stored there. The evaporator serves in this case as the reservoir for the functional medium. At the same time, the operation of the evaporator is positively influenced by the functional medium.

In a further embodiment, a condensate return is provided between the condenser and the evaporator, via which condensate return, simultaneously with an evaporation proceeding in the evaporator and a condensation proceeding in the condenser, a transfer of portions of the condensed operating medium from the condenser into the evaporation process within the evaporator may be performed. Hereby, it is possible to control during the evaporation process in the evaporator the quantitative proportion between the operating medium and the functional medium to be within a determined range.

In one embodiment with an evaporator/condenser, the functional medium is present in the evaporator/condenser as a permanent liquid stock. The operating medium condenses into the functional medium and is again evaporated out from the functional medium. The functional medium itself, however, remains within the evaporator/condenser and is neither significantly adsorbed nor desorbed.

In a further embodiment, the functional medium is provided as a heat transfer medium in an evaporator and/or a hydraulic circuit open towards the adsorption heat pump and connecting the condenser or the evaporator/condenser to external heat sources and/or heat sinks. The functional medium here fulfills a double function as a vapor pressure-lowering medium in the operating circuit, on the one hand, and as a heat transfer medium, on the other. The hydraulic circuit being open means here in particular that the hydraulic circuit is not thermally coupled via a heat transfer surface. Rather, the heat transfer is performed such that the operating medium directly condenses into the functional medium or evaporates from there and heat is thus transferred by the mixing and separating processes between the operating medium and the functional medium.

In one embodiment, the reservoir in the liquid half-circuit serves as a metering unit for setting a defined quantitative proportion between the operating medium and the functional medium.

In one embodiment, the reservoir is configured as a separating device for the operating medium, in which a separating process may be realized between the operating medium and the functional medium and the operating medium and/or the functional medium may be discharged from the separated areas via separate outlets in modified concentrations.

In a variant, the reservoir is a container tempered to a defined separating temperature, with a critical quantitative proportion between the operating medium and the functional medium corresponding to the separating temperature.

In one embodiment, the functional medium is an ionic liquid consisting in particular of alkylated or non-alkylated cations in the form of imidazolium, pyridinium, pyrrolidinium, guanidinium, uronium, thiouronium, piperidinium, morpholinium, ammonium and phosphonium, and of anions in the form of halides, tetrafluoroborates, trifluoroacetates, triflates, hexafluorophosphates, phosphinates or tosylates.

In a further embodiment, the functional medium is a wetting-promoting additive. In a further embodiment, the functional medium is an antifreeze and/or corrosion-inhibiting agent. These agents and additives may also be ionic liquids at the same time.

A method for operating an adsorption heat pump with an operating circuit of an adsorber, an evaporator and a condenser or an evaporator/condenser and an operating medium which is circulated between the adsorber, the evaporator and the condenser is executed such that the operating medium is mixed, when running through the operating circuit, within the liquid half-circuit with a liquid functional medium which lowers the vapor pressure, and the operating medium is at least partially separated from the functional medium before the transfer into the gaseous half-circuit of the operating circuit.

In one design of the method, the condenser and the evaporator are mutually coupled by a controlled condensate return, with the quantitative proportion between the operating medium and the functional medium being set by the amount of the operating medium returned via the condensate return.

In one embodiment, the liquid operating medium is at least partially separated from entrained portions of the functional medium by a separating device at the latest before the transfer from the liquid half-circuit into the gaseous half-circuit, wherein a discharge of the operating medium and/or the functional medium from thereby developing separated portions is performed into the evaporator and/or the condenser in the operating circuit of the adsorption heat pump.

In one embodiment, the separating device is tempered to a separating temperature that is characteristic for the mixture of the operating medium and the functional medium.

In a variant, the separating of the operating medium and functional medium is performed in the evaporator. This is performed in particular in the normal evaporation process during the operation of the adsorption heat pump.

In one embodiment, the functional medium or a mixture of the operating medium and functional medium is temporarily stored in a reservoir within the liquid half-circuit of the operating circuit and is output from there into the liquid half-circuit, with a predetermined quantitative portion between the operating medium and the functional medium being set.

In one embodiment, the functional medium from the reservoir is conducted into the evaporator, with an interruption of the evaporation of the operating medium being caused in the evaporator by lowering the vapor pressure or a flushing out of the operating medium being executed.

The inventive adsorption heat pump and the method for operating the adsorption heat pump will be explained below in greater detail on the basis of exemplary embodiments. The attached Figures are conducive to intelligibility. The same reference numerals will be used for identical part or parts of identical action.

Figure 2:
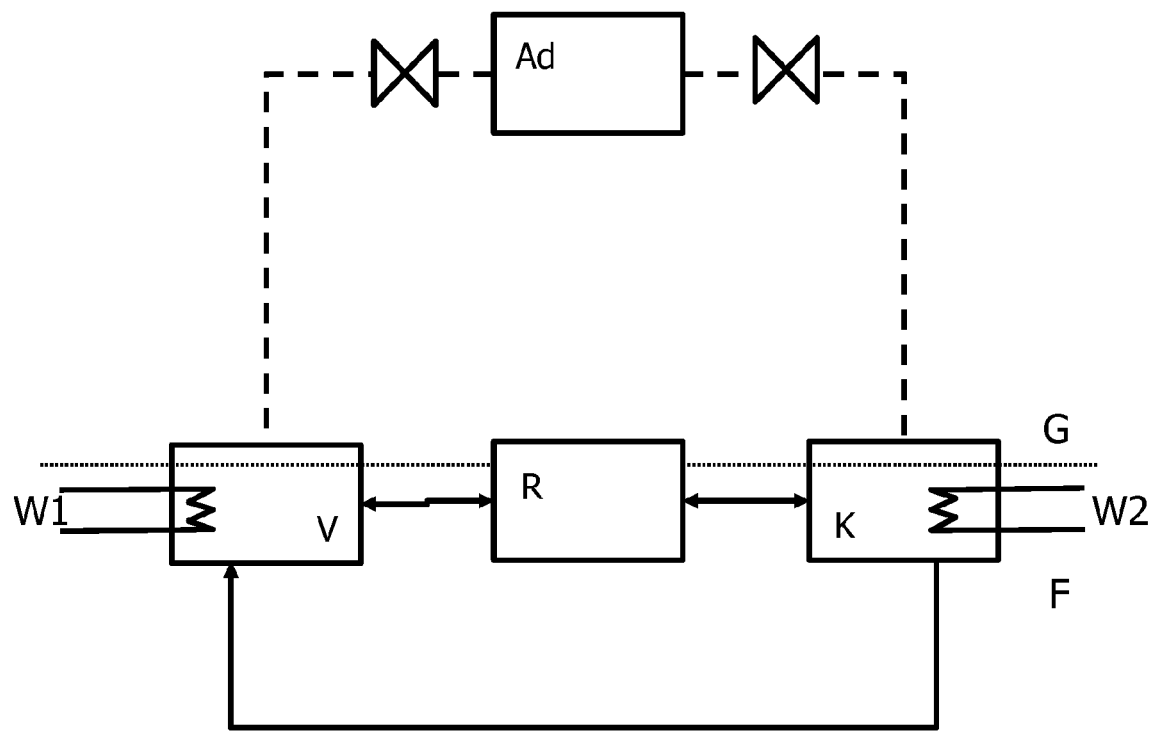
Figure 3:
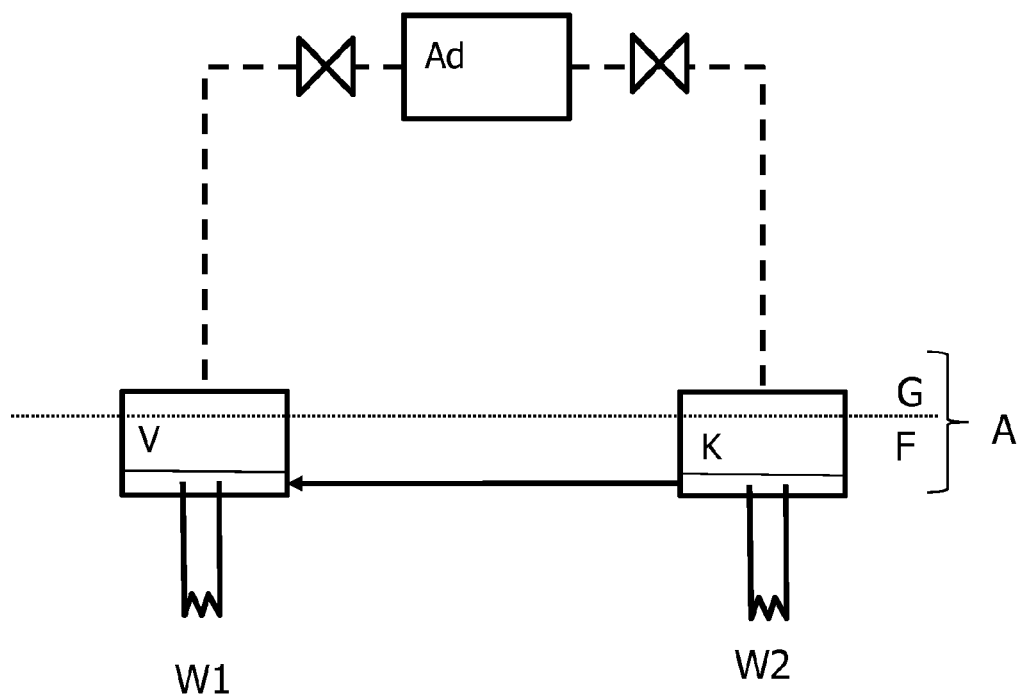
Figure 4:
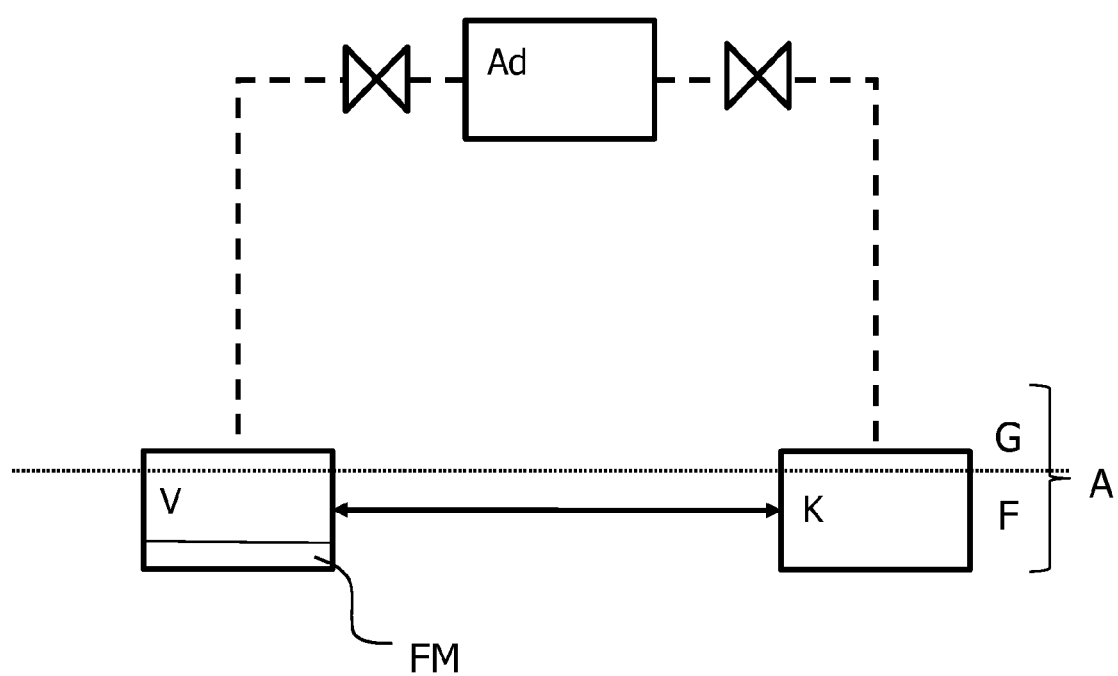
Figure 5:
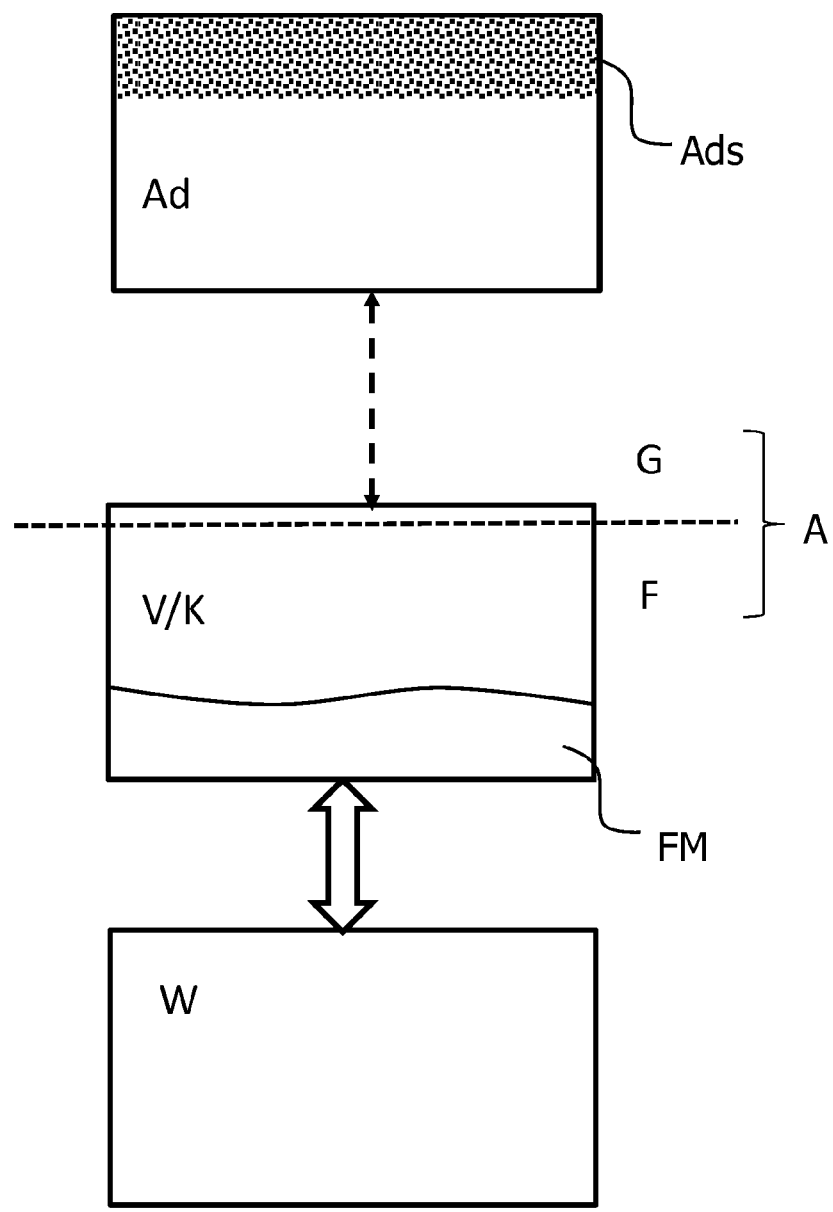
Figure 6:
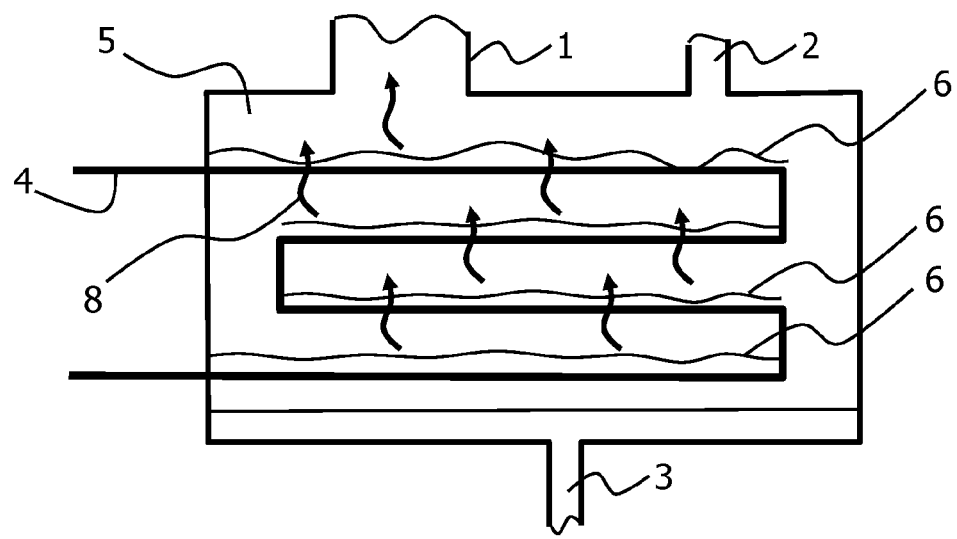
Figure 7:
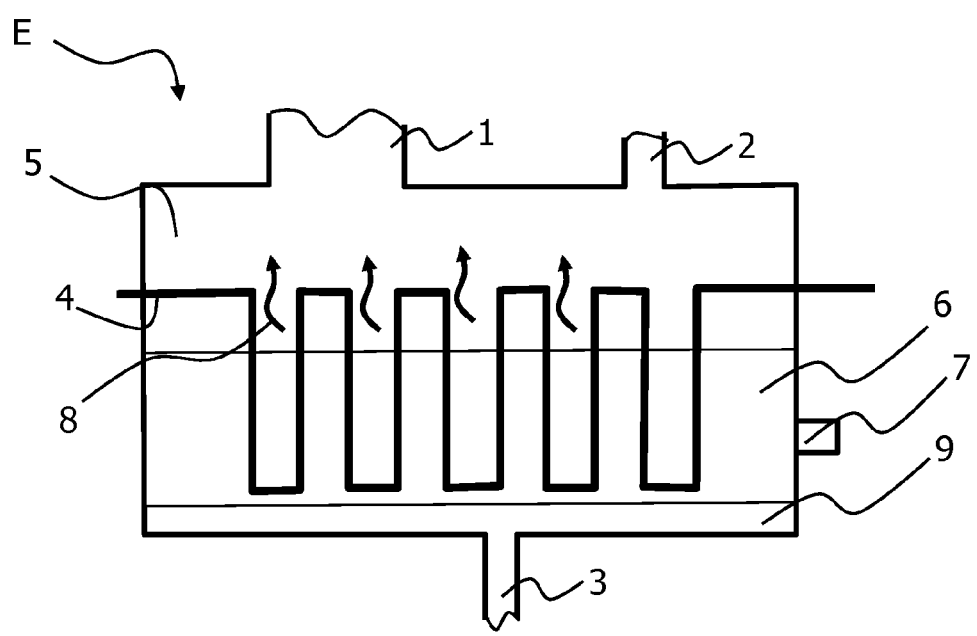
Figure 8:
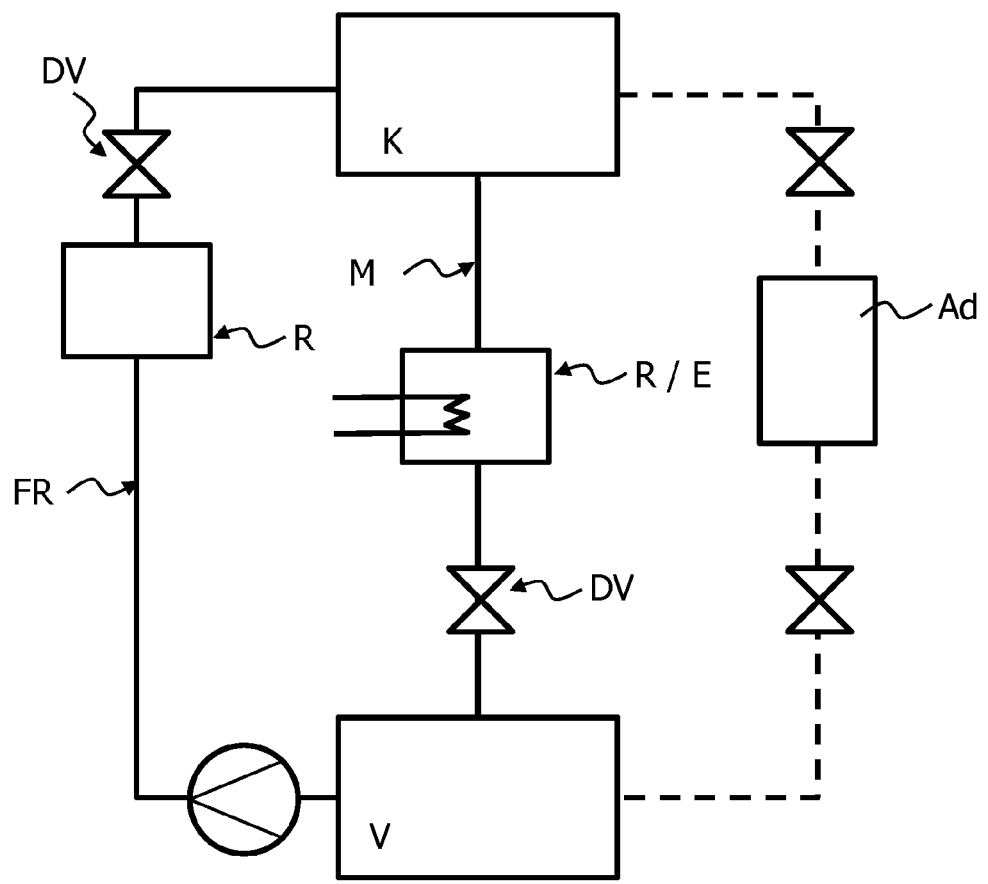

Shown are in:

FIG. 1 an exemplary structure of an adsorption heat pump in a first embodiment, FIG. 2 an exemplary structure of an adsorption heat pump in a second embodiment, FIG. 3 an exemplary structure of an adsorption heat pump in a third embodiment, FIG. 4 an exemplary structure of an adsorption heat pump in a fourth embodiment, FIG. 5 an exemplary structure of an adsorption heat pump in a fifth embodiment, FIG. 6 an exemplary structure of an evaporator with return connections for the operating medium mixture, FIG. 7 an exemplary representation of the separation and return of a separated phase of the functional medium, FIG. 8 an exemplary representation of an adsorption heat pump having respectively one reservoir in the condensate return and one reservoir in the functional medium return.

FIG. 1 shows a first embodiment of the adsorption heat pump according to the invention.

The adsorption heat pump includes an adsorber device Ad which is formed in the example given here in the form of two sub-adsorbers Ad1 and Ad2. The adsorber device is switched by means of switching valves V1 to V4. Furthermore, the adsorption heat pump includes an evaporator V and a condenser K.

The operating medium, e.g. water, is adsorbed on a solid absorbant in the adsorber device. Hereby, it changes into a gaseous state in the evaporator V. At the same time, the evaporator takes up heat from the environment. In a further step, the operating medium is expelled for the adsorber device, for example, by supplying external waste heat.

When in the gaseous state, the operating medium then gets into the condenser K and is liquefied there. At this time, the operating medium gives off the heat received at the evaporator along with the heat supplied at the adsorber device. Via a return, the operating medium in a liquid state then gets back into the evaporator. The operating circle of the adsorption heat pump is thereby closed.

The operating circuit A formed between the evaporator A, the adsorber device Ad and the condenser K thus includes sections where the operating medium is present in a gaseous form, and a section where the operating medium is present in a liquid form. That part of the operating circuit where the operating medium is gaseous, is referred to below as the gaseous half-circuit G. Correspondingly, the section where the operating medium is liquid is referred to as the liquid half-circuit F.

Both the exemplary embodiment shown in FIG. 1 and the exemplary embodiments specified in the following Figures are exclusively related to the processes in the liquid half-circuit F of the adsorption heat pump operating circuit, unless processes in the gaseous half-circuit G are explicitly mentioned.

Within the liquid half-circuit F, the operating medium is mixed with a functional medium. Within the gaseous half-circuit G, however where the operating medium has assumed the gaseous phase, there is no functional medium. This means that the operating medium is separated from the functional medium at the latest in the evaporator V and, at the earliest, enters again into a mixing contact with the functional medium in the condenser K.

The functional medium may thereby execute different tasks. An essential aspect is in this respect a vapor pressure reduction of the operating medium during the evaporation process within the evaporator V. In the example shown here, the operating medium mixed with the functional medium enters into the evaporator V via a mixing branch M of the liquid half-circuit. In the evaporation process taking place now, the operating medium is separated from the functional medium. The functional medium thereby remains in the evaporator and is accumulated there. Hereby, the quantitative proportion in the mixture of the operating medium and the functional medium is changed. In order to set the quantitative proportion during the evaporation process again, a functional medium return FR is provided in the example shown here. Via the functional medium return, a mixture enriched with the functional medium is transferred from the evaporator V into the condenser K.

In the example shown here, the functional medium return FR is linked with an operating mode of the adsorption heat pump in which the evaporation and the condensation of the operating medium are performed simultaneously. In association therewith, the adsorber device Ad is subdivided into two sub-adsorbers Ad1 and Ad2 and switched by a valve device V1 to V4. While the first sub-adsorber Ad1 executes an adsorption process and thereby causes the operating medium to evaporate in the evaporator, the second sub-adsorber Ad2 executes a desorption of the operating medium which condenses in the condenser. Thus, the condensate resulting from the temporally simultaneous condensation is transferred from the condenser into the evaporator and sets the quantitative proportion between the operating medium and the functional medium to a predetermined value therein.

The functional medium remaining in the evaporator is discharged again from the evaporator in the example shown here. Via the functional medium return FR, it gets back into the condenser K. The functional medium may hereby act in the condenser as an antifreeze agent, a corrosion inhibitor or else as a liquid promoting wetting of the condenser.

In principle, the liquid half-circuit F of the adsorption heat pump is thus complemented in the example of FIG. 1 by a functional medium circuit, in which the functional medium is mixed at a first point, here in the condenser, with the operating medium, is then carried along with the operating medium, and is finally separated from the operating medium, here in the evaporator, whereupon it is returned again to the location of a new mixing contact with the operating medium.

FIG. 2 shows a further exemplary embodiment of the adsorption heat pump. Here as well, the adsorption heat pump includes an evaporator V, the adsorber device Ad and the condenser K. Via external heat exchangers and heat carrier circuits W1 and W2, both the evaporator and the condenser K here are connected to external heat sources and heat sinks, which may in particular be formed as low-temperature heat sources and medium-temperature sinks.

In the example present here, the functional medium is in a reservoir R and is fed into the evaporator and/or the condenser from there or is returned into the reservoir. The reservoir may be formed in different ways as will be illustrated in greater detail further below. Here, a separating device is in particular possible, in which the functional medium is separated from the operating medium, wherein the separated components may be conducted to the evaporator, the condenser or to any other location in the liquid half-circuit F in varying amounts.

FIG. 3 shows an embodiment of the adsorption heat pump, in which the heat carrier circuits W1 and W2 are formed as open hydraulic circuits at the evaporator V and the condenser K. In the condenser, the heat carrier circuit W2 present there may likewise be formed to be hydraulically open, but also to be closed.

The functional medium circulates in these open hydraulic circuits and thus serves in addition as a heat transferring and heat conducting medium with a direct material and inter-mixing contact to the operating medium in the operating circuit of the adsorption heat pump. The mixture of the operating medium and functional medium circulating in the heat carrier circuits thereby guarantees in particular that the circuits W1 and W2 will not freeze. The mixture of the functional medium and operating medium, as described, is separated in the evaporator during the evaporation process and sucked into the gaseous half-circuit G of the operating circuit, wherein the functional medium remains in the heat transfer circuit W1, cools down, and, via the heat transfer from the external low-temperature source, in addition feeds heat directly into the evaporation process.

Correspondingly, the operating medium condenses in the condenser into the functional medium of the open hydraulic circuit W2 and emits heat into the functional medium, which heat is conveyed to a medium-temperature sink.

FIG. 4 shows an embodiment of the adsorption heat pump, in which the functional medium is exclusively provided in the evaporator V. The operating medium gets in this case in a liquid form from the condenser K into the evaporator V and forms a mixture having a reduced vapor pressure with the functional medium FM present there. The embodiment shown here actually may also feature a condensate return. The functional medium, however, is not led out from the evaporator, in particular not into the condenser. But it can be collected in a reservoir that is not shown here.

In the embodiment of FIG. 4, the evaporator, apart from the evaporator function, simultaneously fulfills the function of the reservoir for the functional medium as well as the function of a separating device.

FIG. 5 shows an embodiment of the adsorption heat pump, in which the evaporator and the condenser are structurally integrated in a combined evaporator/condenser V/K. Depending on the operating cycle, the evaporator/condenser is used as an evaporator for the operating medium, wherein heat is taken up, or as a condenser, wherein the operating medium emits heat when condensing. In such a case, the evaporator/condenser is generally coupled to an external, accordingly switched heat transfer circuit W, which alternately introduces heat from a low-temperature source or discharges heat to a medium-temperature sink.

In this embodiment, the gaseous half-circuit G is composed of a connecting line between the evaporator/condenser V/K and the adsorber device Ad. The liquid half-circuit F, on the other hand, is mainly composed only of the evaporator/condenser, in particular of the sections of the evaporator/condenser from where the operating medium condenses or in which it condenses again and thus is present in a liquid form and is mixed with the functional medium.

The functional medium FM here is permanently in the evaporator/condenser. It may in particular form a permanent liquid level in which the condensed operating medium is collected and from where it is evaporated.

In contrast, there is no functional medium in the adsorber device. Therein, the unmixed operating medium exclusively is adsorbed in or desorbed from a solid adsorbent.

In the following, some of the components and interconnections of components of the adsorption heat pump will be explained in more detail based on examples. In this case, ionic liquid is assumed to be the functional medium. It should be understood that other substance classes as well may be used as functional media.

In the explanation of the following exemplary embodiments, an operating medium is taken as a basis which is water in the following examples. Of course, other substances as well, for instance alkanols or else ammonia, which interact with ionic liquids in the manner described below, may be used to this effect.

Quite a number of different substances may be used as ionic liquids. Such substances are organic salts, the formation of a stable crystal lattice being impeded in the ions thereof by various effects. Even low thermal energy is sufficient to break the crystal structure. Ionic liquids therefore are salts which are in particular liquid at room temperature, without the salt being dissolved in a solvent.

Generally, ionic liquids are characterized by a vapor pressure that is extremely low for liquid substances, i.e. by a high evaporation temperature at a given ambient pressure as compared to the operating medium. Such liquids virtually do not change into the gaseous phase at the temperatures that are usual for adsorption heat pumps in the low-temperature range. Ionic liquids having a vapor pressure at 25° C. of below 0.1 mbar are suitable. In addition, there is an important variability allowing to find suitable substances for each operating range of adsorption heat pumps, i.e. for different resulting vapor pressure ranges.

In the present exemplary embodiments of adsorption heat pumps and adsorption heat installations, ionic liquids are used which are of a comparably low hydrophilicity. These liquids give the operating medium additional positive characteristics. The ionic liquids cause, for example, a setting and buffering of pH values, a corrosion-inhibiting action and an antifreeze effect. The wetting of the evaporator may also be positively influenced by selecting suitable ionic liquids of appropriate viscosity and density.

Important for the application of the operating medium in the evaporator is the quantitative proportion between the operating medium and the ionic liquid. This quantitative proportion determines the resulting vapor pressure of the operating medium. Due to the evaporation of the operating medium, an accumulation of the ionic liquid takes place in the evaporator. Hereby, the ionic quantitative proportion between the operating medium and the ionic liquid is changed.

To keep the ionic quantitative proportion of the operating medium in the desired range, pure, unmixed operating medium, i.e. in the present case water, may either be additionally metered or the parts of the operating medium that are enriched with the ionic liquid may be withdrawn from the operating circuit and elsewhere be introduced into the operating circuit again.

This additional metering of the pure operating medium and/or withdrawing of components of the operating medium that are enriched with the ionic liquid create additional options for the optimized control of the evaporation process in the adsorption heat pump.

The ionic quantitative proportion may in particular be set by using ionic liquids of a limited water miscibility in the operating medium. In such mixtures, a separation takes place at a given temperature below a critical ionic quantitative proportion, and the denser phase of the operating medium, where the ionic liquid is, may be pumped out.

The introduction of the ionic liquid into the operating circuit may be performed in different ways. A first option is to provide, in an external reservoir, a mixture of the operating medium and the ionic liquid as a stock and to feed the mixture into the operating circuit at a suitable place. Yet, it is also possible to hold the ionic liquid in a container of its own and to feed it into the operating circuit in an unmixed state. Hereby, the evaporator or the condenser of the operating circuit lend themselves as a feeding point.

The feeding of the ionic liquid into the evaporator is performed, for instance, by supplying a mixture of operating medium and ionic liquid. When being fed into the evaporator, the operating medium passes over into the gaseous phase during the operating cycle of the adsorption heat pump, with the ionic liquid positively influencing the evaporation process but otherwise remaining in the evaporator. In this case, the evaporator acts as a separating device in which the ionic liquid is collected and needs to be discharged in a controlled manner.

When the ionic liquid is fed into the condenser, for example, the pure operating medium is first condensed there and the ionic liquid added in time only after the condensation is completed. The ionic liquid thus does not influence the condensation process as such. If in a next step of the operating cycle the condenser serves as an evaporator, the evaporation process is now executed on the operating medium that is mixed with the ionic liquid. In this process, the ionic liquid remains and may be discharged again. The subsequent condensation process is thus performed again with the virtually unmixed operating medium in a condenser that is free from ionic liquid.

But the ionic liquid may also remain immobilized in the evaporator. In such a case, its accumulation in the evaporator is definitely desired. Hereby, only the operating medium that is free from the ionic liquid is circulated in the remaining operating circuit, whereas the ionic liquid in the evaporator preponderantly influences the evaporation characteristics of the operating medium. In order to configure the ionic quantitative proportion in the evaporator to be settable, in this case the direct condensate return between the condenser and the evaporator is used.

FIG. 6 shows an exemplary basic structure of an evaporator with a return of the ionic liquid or the operating means enriched with ionic liquid.

The evaporator includes a connection 1 for the vapor transfer within the operating circuit of the operating medium as well as a connection 2 for the condensate return. Connection 1 constitutes the usual coupling of the evaporator into the circuit of the adsorption heat pump. Via connection 1, the evaporator is connected to the adsorber for the operating medium which is not shown here. Via connection 2 unmixed operating medium from the condenser is directly supplied to the evaporator by by-passing the adsorber.

Furthermore, a connection 3 is provided which serves the purpose of supplying and/or returning the ionic liquid or the operating means enriched with ionic liquid. Via connection 3, the charging of the evaporator with the ionic liquid may be altered. Via connection 3, the ionic liquid is either supplied from a reservoir for the ionic liquid or from a metering device present in the operating circuit and/or is discharged to the corresponding components.

Here, the evaporator is coupled to the low-temperature source via a tempering circuit 4 and receives heat from there. The tempering circuit is formed with a heat transfer surface within the evaporator.

The operating medium flows through the evaporator and on this occasion impinges on the heat transfer surface of the tempering circuit. Hereby, an evaporating mixture layer 6 is formed. This mixture layer may develop in different ways. If the operating medium already contains ionic liquid, this mixture layer develops by the accumulation of the operating medium on the tempering circuit. A permanent covering of the surface of the tempering circuit by the ionic liquid, however, is also possible. On this occasion, the operating medium encounters the ionic liquid covering in a pure state and mixes with the ionic liquid covering, whereby the mixture layer is formed. Within this mixture layer, the evaporation characteristics of the operating medium, in particular its vapor pressure, are extensively modified.

During the evaporation process, the evaporating operating medium, in the present example water vapor 8, passes into a vapor chamber 5 of the evaporator and escapes via connection 1 toward the adsorber in the operating circuit, which is not shown here. The operating medium enriched with ionic liquid may be discharged from the evaporator via connection 3.

FIG. 7 shows an exemplary representation of the separation and return of a separated phase of the ionic liquid. Here, the device is configured as a separating device E. But it may also be operated as an evaporator or condenser.

The separating device E is likewise tempered via a tempering circuit 4. The tempering circuit immerges at least in part in a bath of the operating medium initially mixed with the ionic liquid and maintains the same at a predetermined temperature. In the present example, an evaporating mixture layer 6 develops in the volume of the operating medium.

The operating medium enters the separating device in a liquid form. In this particular case, the operating medium is supplied via a connection 2, whereas it exits the separating device E via connection 1 in a gaseous form.

The operating medium, in this particular case water, passes into the vapor chamber 5 of the separating device as a water vapor 8 that is virtually free from portions of ionic liquid, and is discharged via connection 1 of the vapor transfer. Via connection 2, water may be introduced into the evaporating mixture layer 6 at any time.

In the separating device, the operating medium exhibits a critical quantitative proportion between the operating medium as such and the ionic liquid portion. In this case, the tempering is set such that a separation occurs at this critical quantitative proportion. The ionic liquid hereby accumulates in the lower area of the separating device in the form of an ionic liquid phase 9 and may be discharged from there via a connection 3. Both the evaporating operating medium, in this particular case water, and the ionic liquid in phase 9 may be transferred into the evaporator of the adsorption heat pump, wherein a predetermined quantitative proportion may be set for the corresponding parts of the operating circuit.

However, the operating medium does not necessarily need to evaporate in the separating device. Basically, it is sufficient that the operating medium is separated and segregates into two clearly distinguishable phases. In such a case, the operating medium that is largely free from ionic liquid may also be discharged or supplied in the corresponding amounts from the first phase directly via an outlet 7, and the largely unmixed ionic liquid may be discharged or supplied in the corresponding amounts from the phase via connection 3.

The adsorber is appropriately filled with an adsorbent. Zeolites are in particular suitable as the absorbent, which are characterized by a porous system having pore diameters in the range of the size of smaller molecules. Typical zeolites for this application are, for example, but not exclusively, FAU, LTA, CHA, AEI, AFI, MFI, EMT and MOR. Through the pore openings thereof, common absorbents such as water and ammonia may enter the porous system. In the majority of cases, the complex anions and cations of the ionic liquids are too large for this effect. According to the invention, ionic liquids are more suitable than other substances, which can also be used for vapor pressure reduction or an antifreeze effect, such as e.g. ethylene glycol, which can also enter into zeolite pores.

FIG. 8 shows an exemplary representation of an adsorption heat pump with a separating device E. This embodiment of the adsorption heat pump may be selected when the ionic liquid does not remain permanently in the evaporator and/or condenser. The separating unit E is in this case intended to segregate the operating medium from the ionic liquid while cleaning the operating medium and, especially, preventing the ionic liquid from being transferred into the adsorber, and to ensure that the adsorption and desorption processes of the operating medium are not impeded there, and to continue to feed both the evaporator V and the condenser with defined amounts of the ionic liquid depending on the respective operating state and depending on the respective operating phase. Thus, the adsorption heat pump is also intended to act as a metering device.

The reservoir R in the mixing branch M functions as a separating unit. The structure of the reservoir is realized, for example, as in FIG. 7. A determined quantitative proportion between the operating medium and the ionic liquid is in this case set such that a separation between the operating medium and the ionic liquid occurs at a certain temperature. This temperature is achieved and maintained in the separating unit E by tempering. The operating medium thereby segregates from the ionic liquid. Two phases separated from one another by a phase boundary are formed which can be discharged from the separating unit individually.

Once the portion of the ionic liquid exceeds a determined limit value corresponding to a critical quantitative proportion of the temperature within the separating unit, the separation between the operating medium and the ionic liquid occurs there. In such a case, the separating device E serves as a trap or a collecting means for the ionic liquid. In the process, the ionic liquid may be pumped off and reconducted completely, for example, into the evaporator V or condenser via a liquid line. Of course, a transfer of the operating medium via the liquid line is also possible according to the operating state of the installation.

This approach also offers a simple possibility for regulating the quantitative proportion between the circulating operating medium and the ionic liquid in the operating circuit. This regulation is performed via tempering the separating device since the separating device defines the critical quantitative proportion at which the separation is initiated at all. The tempering of the separating unit may thereby be coupled in particular to the temperature in the adsorber Ad or to the temperature in the evaporator and/or condenser and thus establish a regulation circuit for the quantitative proportion and the content of ionic liquid in the operating medium. Hereby, it is in particular possible in case of a strong temperature drop at the evaporator, for example, to withdraw larger amounts of the ionic liquid from the circulating operating medium, to conduct them into the evaporator and to prevent the operating medium there from freezing. The separating device thus acts as a part of an antifreeze device.

The condensate return in the mixing branch M differs from the normal reconduction of the condensed operating medium during normal operation of the adsorption heat pump in one essential aspect that the condensate return is controlled in a targeted manner. This enables a consistent low vapor pressure to be guaranteed during the entire evaporation process, since the quantitative proportion between the operating medium and the ionic liquid may be kept constant in the desired range over a longer period, and the concentration process of the ionic liquid starting toward the end of the evaporation process may be slightly delayed, whereby the vapor pressure of the operating medium is allowed to be controlled.

By a targeted addition of ionic liquid to the operating medium in the evaporator and thus a significant lowering of the vapor pressure of the mixture below the equilibrium vapor pressure of the adsorber, the adsorption process may also be terminated clearly before the adsorbent is saturated. This is advantageous when the adsorption heat pump is also intended for storing energy. By adding operating medium from the condensate return, for instance even under a controlled withdrawal of the mixture in the evaporator, the adsorption process may be continued anew at a later point in time. This method enables the adsorption process to be interrupted in a valveless manner, for instance for the purpose of storing energy in the adsorber.

For regulating the amounts of the ionic liquid in the evaporator and condenser and for storing the ionic liquid a reservoir R may also be provided in the functional medium return.

The adsorption heat pump as well as the method for operating the adsorption heat pump have been described based on exemplary embodiments. Within the scope of a skilled person's action, further configurations are possible.

LIST OF REFERENCE NUMERALS 1 connection for the vapor transfer
2 connection for the condensate return
3 connection for returning the ionic liquid
4 tempering circuit
5 vapor chamber
6 mixture layer
7 solvent outlet
8 water vapor
9 ionic liquid phase
A operating circuit
Ad adsorber device
Ads adsorbent, solid
Ad1 first sub-adsorber
Ad2 second sub-adsorber
DV pressure valve
E separating device
F liquid half-circuit
FM functional medium
FR functional medium reflow or return
G gaseous half-circuit
K condenser
KR condensate return
P pump
R reservoir
V evaporator
V1-V4 valve device
V/K evaporator/condenser
W heat transfer circuit
W1 first heat carrier circuit
W2 second heat carrier circuit

The invention claimed is:
1. An adsorption heat pump, which comprises:
an adsorber device, the adsorber device having a solid adsorbent,
a first medium and a second medium, the first medium being an operating medium, the second medium being a liquid functional medium, wherein the first medium and the second medium are different,
an evaporator and a condenser,
an operating circuit containing the operating medium,
a mixture including the first medium and the second medium,
wherein the operating circuit has a gaseous half-circuit between the evaporator, the adsorber device and the condenser, in which the operating medium is in a gaseous phase,
wherein the operating circuit has a liquid half-circuit which is configured between the evaporator and condenser, in which the operating medium is in a liquid phase,
wherein the liquid half-circuit contains the liquid functional medium,
wherein the liquid half circuit at least transiently contains at least some of the mixture, wherein the operating medium has a first vapor pressure and wherein the operating medium in the mixture has a second vapor pressure, the second vapor pressure being less than the first vapor pressure; and wherein the liquid functional medium is an ionic liquid.

2. The adsorption heat pump according to claim 1, which further comprises:

a mixing branch, the mixing branch being provided in the liquid half-circuit and leading from the condenser to the evaporator, the mixing branch containing at least some of the mixture of the liquid functional medium and the operating medium, and a functional medium return, the functional medium return leading from the evaporator to the condenser, the functional medium return containing at least some of the mixture of the liquid functional medium and the operating medium, wherein the mixture of the liquid functional medium and the operating medium in the mixing branch is depleted, and wherein the mixture of the liquid functional medium and the operating medium in the functional medium return is enriched.

3. The adsorption heat pump according to claim 1, wherein the liquid half-circuit has a reservoir containing the liquid functional medium, with supply lines and discharge lines being provided between the reservoir and the evaporator and/or the condenser and/or in the path of the operating medium between the condenser and the evaporator.

4. The adsorption heat pump according to claim 1, wherein the liquid functional medium remains permanently in the evaporator and is stored there.

5. The adsorption heat pump according to claim 1, wherein a separate condensate return is provided between the condenser and the evaporator, wherein portions of the condensed operating medium from the condenser into the evaporation process within the evaporator are transferred via the separate condensate return simultaneously with an evaporation proceeding in the evaporator and a condensation proceeding in the condenser.

6. The adsorption heat pump according to claim 1, wherein the liquid functional medium or a mixture of the liquid functional medium with the operating medium functions as a heat transfer medium in a hydraulic circuit connecting the evaporator and/or the condenser to external heat sources and/or heat sinks, which hydraulic circuit is open toward the adsorption heat pump.

7. The adsorption heat pump according to claim 1, wherein a reservoir is provided in the liquid half-circuit as a separating device for the operating medium, the reservoir having a separated area therein, wherein the operating medium and the liquid functional medium are separated in the reservoir, and wherein the operating medium or the liquid functional medium is dischargeable separately from the separated area in an enriched form.

8. The adsorption heat pump according to claim 7, wherein the reservoir is a container tempered to a defined separation temperature, the defined separation temperature corresponding to a critical quantitative proportion between the operating medium and the liquid functional medium.

9. The adsorption heat pump according to claim 1, wherein the liquid functional medium is a wetting-promoting additive.

10. The adsorption heat pump according to claim 1, wherein the liquid functional medium is an antifreeze and/or corrosion-inhibiting agent.

11. The adsorption heat pump according to claim 1, wherein the liquid functional medium is an ionic liquid consisting of one of alkylated and non-alkylated cations.

12. A method for operating an adsorption heat pump, the adsorption heat pump comprising an adsorber device, an operating circuit, the operating circuit having a liquid half-circuit and a gaseous half-circuit, an evaporator and a condenser, a first medium and a second medium, the first medium being an operating medium, the second medium being a liquid functional medium, wherein the first medium and the second medium are different, wherein the liquid functional medium is an ionic liquid, wherein the operating medium is circulated between the adsorber, the evaporator and the condenser, the method comprising the steps of:

mixing the operating medium with the liquid functional medium within the liquid half-circuit, the mixing of the operating medium with the liquid functional medium lowering the vapor pressure of the operating medium, transferring the operating medium from the liquid half-circuit to the gaseous half-circuit, wherein the operating medium is separated from the liquid functional medium during the transfer into the gaseous half-circuit.

13. The method for operating an adsorption heat pump according to claim 12, wherein the condenser and the evaporator are mutually coupled by a controlled condensate return and/or via a reservoir, with a quantitative proportion between the operating medium and the liquid functional medium in the evaporator being set by an amount of the operating medium returned via the condensate return or by a controlled withdrawal of the mixture with the operating medium enriched with liquid functional medium.

14. The method according to claim 13, wherein from the reservoir, a discharge of the operating medium and/or the liquid functional medium separated from the liquid operating medium is performed into the evaporator and/or the condenser in the operating circuit of the adsorption heat pump.

15. The method according to claim 14, wherein the reservoir is tempered to a separating temperature that is characteristic for the mixture of the operating medium and the liquid functional medium.

16. The method according to claim 12, wherein the separating of the operating medium and the liquid functional medium is performed in the evaporator.

17. The method according to claim 12, wherein the liquid functional medium or a mixture of the operating medium and the liquid functional medium is temporarily stored in a reservoir within the liquid half-circuit of the operating circuit and is output from the reservoir into the liquid half-circuit, with a predetermined quantitative portion between the operating medium and the liquid functional medium being set.

18. The method according to claim 17,
wherein
the liquid functional medium from the reservoir is conducted into the evaporator, wherein an interruption of the evaporation of the operating medium in the evaporator is caused by lowering the vapor pressure or a flushing out of the operating medium being executed.

19. An adsorption heat pump, which comprises:
an adsorber device, the adsorber device having a solid adsorbent,
a first medium and a second medium, the first medium being an operating medium, the second medium being a liquid functional medium, wherein the first medium and the second medium are different,
a combined evaporator/condenser,
an operating circuit containing the operating medium,
a mixture including the first medium and the second medium,
wherein the operating circuit has a gaseous half-circuit between the adsorber device and the combined evaporator/condenser, in which the operating medium is in a gaseous phase,
wherein the operating circuit has a liquid half-circuit which includes at least a portion of the combined evaporator/condenser, in which the operating medium is in a liquid phase,
wherein the liquid half-circuit contains the liquid functional medium,
wherein the liquid half circuit at least transiently contains at least some of the mixture,
wherein the operating medium has a first vapor pressure and wherein the operating medium in the mixture has a second vapor pressure, the second vapor pressure being less than the first vapor pressure; and
wherein the liquid functional medium is an ionic liquid.

20. The adsorption heat pump according to claim 19,
wherein
the liquid functional medium is present in the combined evaporator/condenser as a permanent liquid stock.

21. A method for operating an adsorption heat pump, the adsorption heat pump comprising an adsorber device, an operating circuit, the operating circuit having a liquid half-circuit and a gaseous half-circuit, a combined evaporator/condenser, a first medium and a second medium, the first medium being an operating medium, the second medium being a liquid functional medium, wherein the first medium and the second medium are different, wherein the liquid functional medium is an ionic liquid, wherein the operating medium is circulated between the adsorber and the combined evaporator/condenser, the method comprising the steps of:
mixing the operating medium with the liquid functional medium within the liquid half-circuit, the mixing of the operating medium with the liquid functional medium lowering the vapor pressure of the operating medium,
transferring the operating medium from the liquid half-circuit to the gaseous half-circuit, wherein
the operating medium is separated from the liquid functional medium during the transfer into the gaseous half-circuit.

* * * * *